United States Patent Office 2,752,755
Patented July 3, 1956

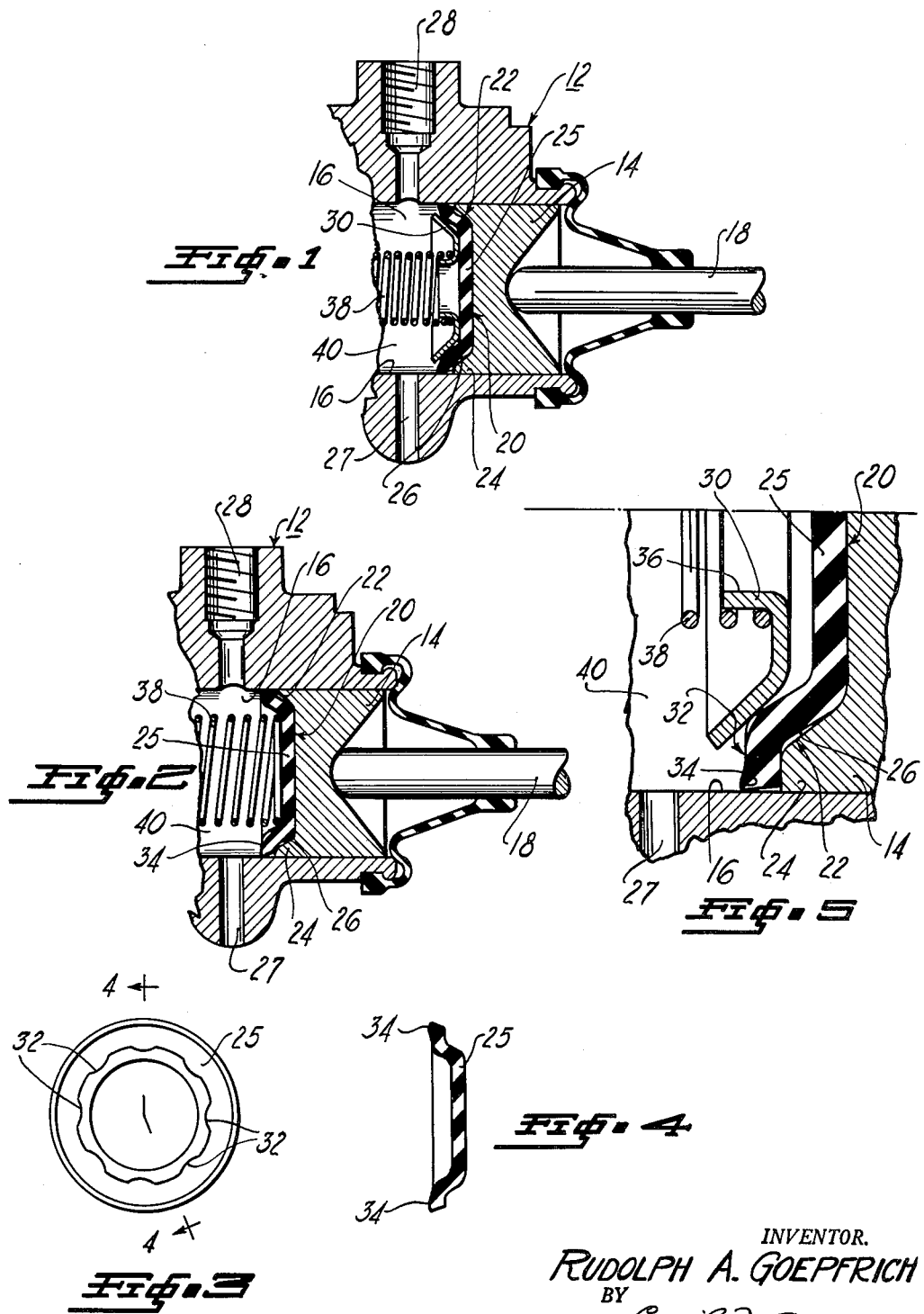

2,752,755

SEAL SPREADER FOR HYDRAULIC BRAKE ACTUATOR

Rudolph A. Goepfrich, South Bend, Ind., assignor to Bendix Aviation Corporation, South Bend, Ind., a corporation of Delaware Application September 10, 1952, Serial No. 308,883

5 Claims. (Cl. 60—54.6)

This invention relates to brakes, and particularly to the construction of hydraulic brake actuators or wheel cylinders. The application of hydraulic pressure to spread the ends of the brake shoes causes the shoes to move outwardly from their normal or released position into engagement with a rotating drum. The amount of travel of the brake shoes from the released to the applied position will vary; and, will become successively greater as the brake lining diminishes. Accordingly, it is necessary for the wheel cylinder piston to be actuated through a variable length which must correspond to the distance between the applied and the released position of the shoe.

It is therefore the primary object of the present invention to provide a wheel cylinder construction in which the piston can be actuated over a wide range without elongation of the wheel cylinder at the expense of brake area.

A related object of this invention is that the primary object shall be achieved by means of an inexpensive and simple mechanism.

A yet further object is that the wheel cylinder construction may be readily serviced and that the wheel cylinder can easily be purged of any air in the lines.

Other objects and advantages of the present invention will become apparent during the course of the following description, reference being had therein to the following drawings, in which.

Figure 1 is a fragmentary view of a wheel cylinder assembly showing a hydraulic actuator in section with the sealing, spreading and spring means as component parts;

Figure 2 illustrates the wheel cylinder without the spreader means;

Figure 3 is a front view of the sealing member;

Figure 4 is a section view of the sealing member taken along line 4—4 of Figure 3; and Figure 5 is a partial enlargement of the assembly of Figure 1, Referring to the drawings, a hydraulic actuator 12 is secured by some suitable means to a backing plate (not shown). A piston 14 is reciprocably mounted in cylinder 16 and is operatively connected by means of a thrust link 18 to a friction member (not shown) which is in turn applied against a rotating drum to cause the braking force. The head 20 of piston 14 is provided with a peripheral, annular flange 22 having a flat-top portion 24 and sides 26 inclined toward the middle of the head 20 of the piston 14. The resulting configuration is that the central portion of the piston head 20 is dished or recessed from the outer periphery.

The purpose of the flange member 22 on the face 20 of piston 14 is to provide bearing in the cylinder 16. In prior art devices, the sealing member has been mounted on flat-faced piston members and the maximum retracted position of the piston in the cylinder was determined by the width or thickness of the seal member and the position of the inlet and "bleeding" port. For illustration of this type of device, reference is made to Patent No. 2,308,875, issued January 19, 1943.

Through the present invention, it is possible by recessing the mid-portion of the head 20 of the piston 14 and nesting the sealing member 25 therein to increase the maximum retracted position of the piston 14 without interference with the inlet 27 and bleed ports 28 respectively. In other words, the combined length of the piston member and sealing member has been decreased (without loss of sealing action) and the piston may accordingly more nearly approach the bleed port 28 and inlet port 27 without obstructing or blocking these ports. It is also possible with my new hydraulic actuator device to achieve the same length protractile stroke as the conventional hydraulic actuator devices with "flat-headed" pistons without any danger of cocking or misalignment of the piston 14 in the cylinder 16. This is possible because I have not altered the length dimension of the piston 14 in contact with the cylinder 16 and it is this dimension which is the measure of the alignment of the piston 14 and cylinder 16 members. It is apparent, therefore, that with my invention, it is possible to increase the amount of utilizable piston travel for a given cylinder and piston length; correlatively, I may obtain an equally effective length of piston travel with a shorter or reduced length hydraulic actuator. It is in this latter capacity that I desire to use my invention, i. e., an equally effective piston stroke with a shorter hydraulic actuator construction. With a shorter hydraulic actuator construction, there may be realized greater braking area, since the braking element is proportionally circumferentially increased.

The sealing member 25 conforms approximately to the configuration of the piston head 20 and is urged into sealing relation with the latter by means of a spreader member 30. The surface 32 of the sealing member 25 is scalloped, the purpose of which is to allow passage of entrained air bubbles through the peripheral contact area of spreader 30 and sealing member 25. Because there is provision for the flow of fluid through the peripheral regions of the aforementioned area, there is a complete and efficient purging of air from the entire hydraulic actuator as the hydraulic fluid is forced through the inlet port 27 into the wheel cylinder 12 and then out the bleeding port 28.

The spreader member 30 is a sheet metal stamping and its function is to force the lip 34 of the sealing member 25 into intimate contact with flange 22 and the cylinder walls 16. The centrally located hollow boss 36 of the spreader member 30 is urged into position by a concentrically located spring 38. The boss 36 of the spreader is of a standard size so that the diameter of the spring 38 will be the same regardless of cylinder and spreader dimensions. The spring member 38 is stabilized through intimate contact with the boss 36 of the spreader member 30. One end of the spring member 38 is located in the operative position illustrated and the other end bears against either the inner end of the wheel cylinder or an oppositely actuated piston, and sealing member-spreader combination operating in an opposite direction.

In operation, fluid pressure generated by the operator will be transmitted through the port 27 into the wheel cylinder system 40 and the piston 14 will be displaced towards the right to apply the friction element. When the pressure is released, the return springs of the brake mechanism will urge the friction elements to their off-position and the piston 14 will then return to its retractile position.

Throughout the braking cycle, sealing member 25 will be retained in operative position on the piston head 20 so as to prevent any loss of brake fluid through the contact area of the piston 14 and cylinder 16. The spreader member 30 may be eliminated (as shown in Figure 2), if it is desired; and satisfactory results have been obtained for certain uses without utilizing the spreader member as shown in Figure 2. In this embodiment, the natural resiliency of the sealing member 25 is depended upon to maintain the lip 34 in constant sealing relation with the cylinder 16. The spring 38 is positioned on the base of the sealing member 25 without an intermediate spreader member. The spring 38 urges the sealing member against the head recess of the piston 14, and the lip 34 of the sealing member is retained in sealing contact with the cylinder wall 16 by the natural resilency of the seal 25 which is initially radially compressed somewhat to fit in the cylinder bore.

It is to be understood that the above-described embodiments of my invention are for the purpose of illustration only. Various changes may be made therein without departing from the spirit and scope of the invention.

I claim:

1. In a brake having a friction element which is adapted to be alternatively applied, a hydraulic actuator comprising a piston reciprocably received therein, the head of said piston having a recess therein, a resilient seal positioned in said recess, a spreader member having a centrally located boss and a radially outwardly flaring skirt urging the lip of said sealing member against the outer periphery of said piston head and the walls of said cylinder, and a helical spring member concentric with the boss of said spreader yieldably urging said spreader member into engagement with said sealing member.

2. A hydraulic motor comprising a piston reciprocably mounted therein and operatively connected to a friction element, the head of said piston having a peripheral flange with radially inwardly inclined sides, a sealing member also provided with a peripheral flange which bears against the peripheral flange on the head of said piston, the inner periphery of the flange of said sealing member being scalloped, said sealing member being nested on said piston head in the recess formed by said peripheral flange, a spreader member having a centrally located boss, the sides of said spreader being turned back on themselves to form a skirt which bears against the scalloped portion of said sealing member, and means for yieldably retaining said spreader in its operative position.

3. In a brake, a hydraulic actuator comprising a cylinder, a reciprocable piston mounted in said cylinder, the head of said piston having a centrally located cavity and an annular shoulder, a sealing member mounted in said cavity and provided with an offset annular periphery bearing against the shoulder of said piston, said sealing member having a scalloped ring portion formed at the inner edge of said offset annular periphery, and means yieldably bearing against the scalloped ring portion of said sealing member for spreading and retaining it against said piston head.

4. A hydraulic motor comprising a cylinder, a reciprocable piston having a fluid pressure responsive head with a centrally dished portion, sealing means contoured to the shape of said piston head for positioning therein, an offset annular periphery on said sealing means having an outer edge contacting said cylinder and a scalloped circular inner edge which is of smaller radius than said outer edge, a spreader means yieldably urged against the scalloped edge of said sealing means to retain it in operative position on the head of said piston member.

5. In a brake, a hydraulic actuator comprising a cylinder, a piston reciprocably mounted therein and having its fluid pressure responsive head contoured with a peripherally located flange, a sealing member shaped to the configuration of said piston head, an annular periphery offset from the central portion of said sealing member and bearing against the flange of said piston with an edge thereof contacting said cylinder, and a spreader member yieldably bearing against the inner edge on the annular periphery of said sealing member to retain said sealing member in operative position.

References Cited in the file of this patent

UNITED STATES PATENTS

| | | |
|---|---|---|
| 697,140 | Goldschmidt | Apr. 8, 1902 |
| 772,640 | Benson | Oct. 18, 1904 |
| 1,468,600 | Loughead | Sept. 18, 1923 |
| 1,786,231 | Dick | Dec. 23, 1930 |
| 2,079,684 | Church | May 11, 1937 |
| 2,140,778 | White | Dec. 20, 1938 |
| 2,444,181 | Baldwin | June 29, 1948 |

FOREIGN PATENTS

| | | |
|---|---|---|
| 118,729 | Germany | Mar. 20, 1901 |
| 135,229 | Germany | Oct. 16, 1902 |